(No Model.)
J. HANCOCK.
SPRING BED BOTTOM.
No. 415,455. Patented Nov. 19, 1889.
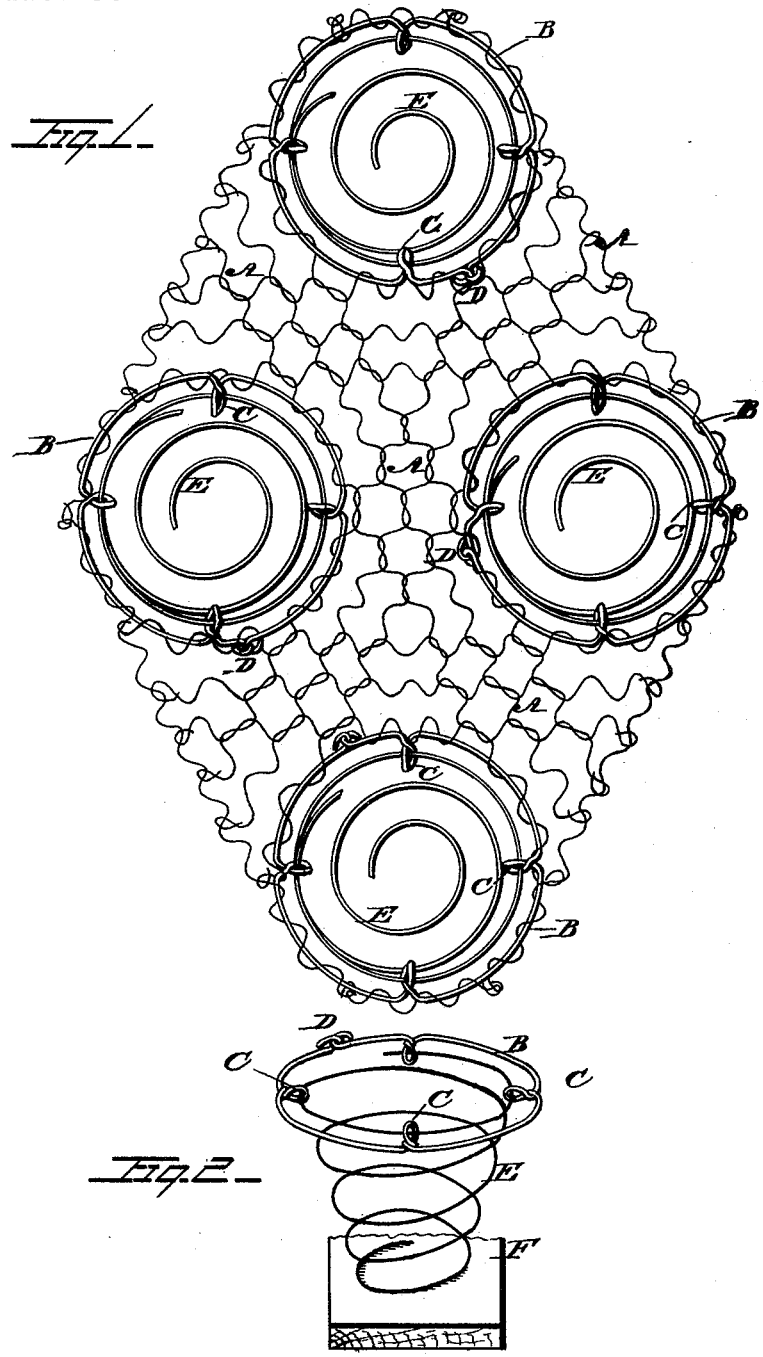
Witnesses:
Saml. M. Furst
H. V. Buckley
Inventor
John Hancock
per George E. Buckley
Atty.

UNITED STATES PATENT OFFICE.

JOHN HANCOCK, OF PHILADELPHIA, PENNSYLVANIA.

SPRING BED-BOTTOM.

SPECIFICATION forming part of Letters Patent No. 415,455, dated November 19, 1889.

Application filed May 15, 1889. Serial No. 310,808. (No model.)

*To all whom it may concern:*

Be it known that I, JOHN HANCOCK, a citizen of the United States, and a resident of Philadelphia, Pennsylvania, have invented a certain new and Improved Spring Bed-Bottom, of which the following is a full and exact description, reference being had to the annexed drawings, making part hereof.

The nature of my invention will appear from the following specification and claims.

In the drawings, Figure 1 is a plan view of a section of one of my bed-bottoms; Fig. 2, a detached perspective of a spring, showing its connection with the key-ring and a broken-off section of a bed-slat.

A A are lines of horizontal spiral-spring wires, formed into a fabric by weaving.

B B are key-rings provided with eyes or loops C C, formed by bends or loops of the ring-wires, the ends of these wires being hooked together as at D.

E E are inverted conical springs.

F represents a portion of a wooden bed-slat, upon which spring E rests, and upon which the latter is secured.

The rings are made of stout wire or other material, so as to avoid as much as possible the danger of breakage.

I am aware that lines of spiral-spring wires with conical and other shaped spiral springs have been used heretofore, in which the ends of the springs have been joined directly to the horizontal lines of spiral wires by passing said ends through the coils of the spirals of the horizontal wires A. In my bed-bottom I use a series of rings B, provided with eyes or loops, the ends of each wire which forms a ring being securely joined together or hooked together with closed hooks. My rings B lie directly in the plane of the woven-wire fabric formed by the horizontal lines of spiral wires A. This construction gives a firm support to the springs and insures a direct downward pressure upon the latter and avoids their liability to upset.

The eyes C may be attached to the rings by other means than that shown, as will readily suggest itself to the mind of an ordinary skilled mechanic.

The drawings show a conical spiral spring E; but other forms of springs may be used, and I do not limit myself to the form shown. Also, the woven fabric shown may be duplicated below the springs E, if desired, and the whole rested upon the slats; but it is not necessary to show this.

I call my rings "key-rings," as they lock or secure the spiral springs to the spiral-wire fabric. The wire forming the ring may be said to be "threaded" through the convolutions of the neighboring spiral wires forming the fabric.

In shipping my bed-bottoms to distant points the sheets of fabric may be rolled up into small space and shipped in one package, and the springs may be shipped in a separate package, box, or barrel. Any ordinary mechanic can put them together when they arrive at their destination.

What I claim as new is—

1. A bed-bottom composed of a woven spiral-wire fabric provided at intervals with closed key-rings having eyes or loops attached thereto, and spiral springs the ends of which are passed through said eyes of the key-rings, substantially as described.

2. A bed-bottom composed of a woven spiral-wire fabric having openings at intervals adapted to receive closed key-rings, the latter being held in place by being threaded through the convolutions of the neighboring spiral wires of the fabric, and the ends of said key-rings being securely joined together, and said key-rings being provided with eyes or loops attached thereto, and spiral springs the ends of which are passed through said eyes of the key-rings, substantially as described.

In witness that the above is my invention I have hereunto set my hand.

JOHN HANCOCK.

Witnesses:
 JOHN CARSON,
 SAML. M. FURST.